Sept. 23, 1924.
A. A. BACKHAUS
1,509,463
PROCESS OF MANUFACTURING ESTERS
Filed Nov. 4, 1921
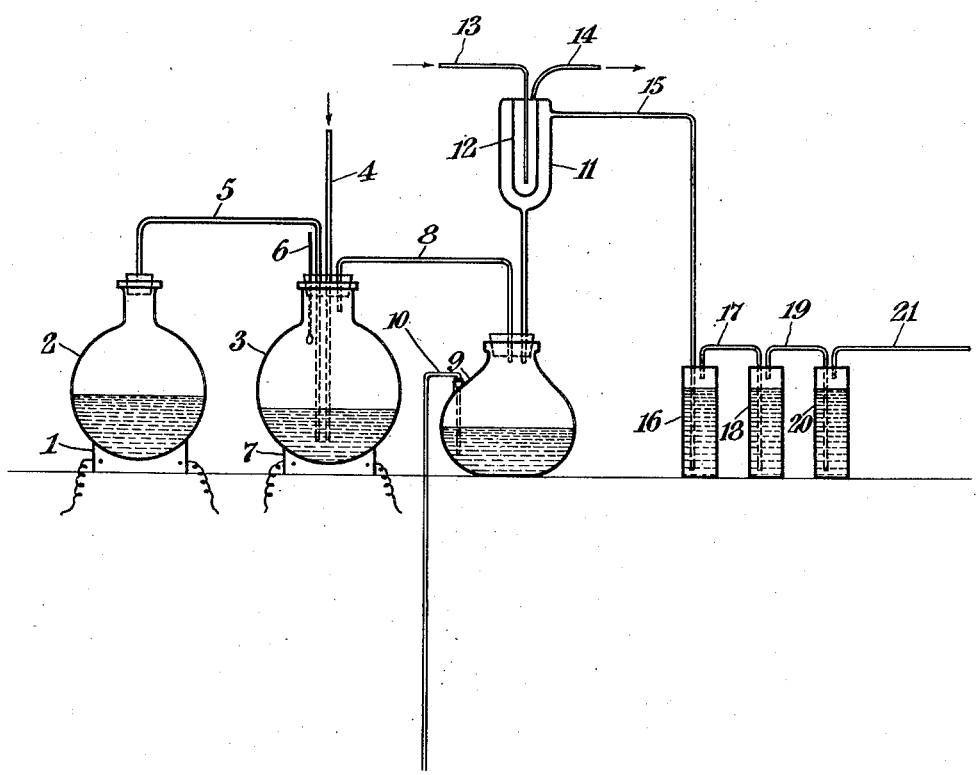
Arthur A. Backhaus
INVENTOR
BY Prindle, Wright, & Snell,
ATTORNEYS Patented Sept. 23, 1924.

1,509,463

UNITED STATES PATENT OFFICE.

ARTHUR A. BACKHAUS, OF BALTIMORE, MARYLAND, ASSIGNOR TO U. S. INDUSTRIAL ALCOHOL CO., INC., A CORPORATION OF WEST VIRGINIA.

PROCESS OF MANUFACTURING ESTERS.

Application filed November 4, 1921. Serial No. 512,749.

*To all whom it may concern:*

Be it known that I, ARTHUR A. BACKHAUS, a citizen of the United States, a resident of Baltimore, State of Maryland, have invented a certain new and useful Process of Manufacturing Esters, of which the following is a specification.

This invention relates to a process of manufacturing esters.

This invention has as an object the preparation of esters by the aid of a catalyst and at the same time avoiding by proper means the accumulation of water in the catalyst during the reaction. It has as an object the production of pure products with a high yield thereof, and it has as a further object the avoidance of the preliminary formation of ethers before the interacting substances arrive in the presence of the catalyst employed.

While the invention may be performed in many types of apparatus, yet for the sake of a specific embodiment the following apparatus used in carrying out the process will be described.

Said apparatus is illustrated by the figure shown on the drawing, representing an apparatus for small scale operations.

In said figure, there is shown an electric hot plate 1 supporting an alcohol flask 2 connected to a second flask 3 by a pipe or tube 5, and the flask 3 has leading thereinto another tube 4 for the admission of acid vapors from any suitable source. A thermometer 6 is inserted in the flask 3. The flask 3 is supported on a hot plate 7 which operates to keep the contents of the flask at any suitable temperature. Within the flask 3 is a mass of zinc chloride or any zinc chloride hydrate, $ZnCl_2XH_2O$, which is kept fused by the heat from the hot plate.

A tube connects the flask 3 to a flask 9 which is provided with a siphon 10 for removing water and alcohol and also with a condenser 11 having a cooling vessel 12 inserted therein, the latter being cooled by water admitted through a pipe 13 and leaving by a pipe 14. A pipe 15 connects the upper part of condenser 11 to the bottom of a vessel 16 containing water. There are two other containers 18 and 20 connected thereto by tubes 17 and 19 respectively, which containers are filled with sodium hydroxide dissolved in water in the proportion of 10 parts by weight of NaOH, 90 parts by weight of water, and concentrated sulphuric acid having a strength of 66° Bé., respectively. An exit pipe 21 leads to a condenser for the alkyl halogen.

In the operation of this apparatus, alcohol is distilled from the flask 2 while hydrochloric acid gas is supplied by the pipe 4, the two substances meeting in a fused mass of the catalyst, zinc chloride, where they react to form ethyl chloride, the water formed being extracted by the zinc chloride and then given up because of the heated condition in which the zinc chloride is maintained. Some water is present with the catalyst at all times, however. The water formed during the reaction is conveyed through the pipe 8 together with the ethyl chloride and residual gases into the flask 9 where the water and some of the alcohol present are condensed and siphoned off through the pipe 10 while the ethyl chloride passes through the condenser 11 and the pipe 15 to the three scrubbers 16, 18 and 20. The ethyl chloride is purified therein and separated from alcohol and acid vapors and then dried prior to being removed through the pipe 21 and condensed.

The temperature in the zinc chloride receptacle should be above the melting point of the zinc chloride hydrate employed, while the condenser should be operated to condense out all of the water formed and the alcohol so that it may be siphoned off. The washing in the bottle 16 containing water is for the purpose of removing most of the acid and the remaining traces are removed in the bottle containing the sodium hydroxide. The scrubbing bottles are not essential since the ethyl chloride can be fractionated from the mixture of alcohol, water and ethyl chloride.

The above method is a continuous one since the water is continually driven out of the fused zinc chloride catalyst so that it is always ready for withdrawing the water. There is an advantage in not mixing the acid and alcohol prior to their interaction, for by avoiding preliminary mixture there is no ether formation of any consequence. Ethyl chloride may be prepared from hydrochloric acid gas and ethyl alcohol vapor with the aid of a zinc chloride catalyst in the manner above described, with a yield of ethyl chloride of from 80 to 85% of the alcohol used.

The process of this invention is of general application to cases where it is desired to prepare an ester or similar compound from an acid and an alcohol by elimination of one or more molecules of water. Wherever several compounds may be condensed to form a new compound, the process may find application by those skilled in the art, the process being obviously capable of variation to suit the peculiarities of particular starting materials. Compounds having the OH group capable of union with the H of another compound, may be operated upon by this process, for example the monohydric alcohols. The polyhydric alcohols may in suitable cases be used. Among the acid compounds capable of reaction with the above alcohols may be named the acids and acid anhydrides such as nitric acid and the nitrogen oxides, $SO_3$ and $SO_2$, phthalic anhydride, volatile alifatic and aromatic acids and their volatile anhydrides, and acetic acid and its anhydride. Anhydrides of the alcohols may also be combined with the acids, for example ether, ethylene, propylene, and propyl ether. By the term "acid" in the claims it is intended to include the acid anhydrides and acid-like bodies capable of condensation with a hydroxy group, and by the term "alcohol" it is intended to include the alcoholic anhydrides.

While many apparently widely different embodiments of this invention may be made without departing from the spirit thereof, it is to be understood that I do not intend to limit myself to the specific embodiment thereof except as indicated in the appended claims.

I claim:

1. The process of manufacturing an aliphatic ester comprising allowing an acid and a monohydric alcohol to interact in the presence of a fused inorganic catalyst maintained at a temperature sufficient to drive off the water formed during the interaction.

2. The process of manufacturing an aliphatic ester comprising allowing an acid and a monohydric alcohol to interact in the presence of fused zinc chloride.

3. The process of manufacturing an ester comprising mixing an acid and an aliphatic alcohol in the presence of an inorganic catalyst maintained at a temperature sufficient to drive off water formed during the interaction, conducting the products formed into a condensing chamber wherein the water is removed, and then separating the ester from the remainder of the products.

4. The process of manufacturing an alkyl halogen comprising allowing a halogen acid and a monohydric alcohol to interact in the presence of a fused catalyst maintained at a temperature sufficient to drive off the water formed during the interaction.

5. The process of manufacturing an alkyl halogen comprising mixing a halogen acid and a monohydric alcohol in the presence of a catalyst maintained at a temperature sufficient to drive off water formed during the interaction, conducting the products formed into a condensing chamber wherein the water is removed, and then separating the alkyl halogen from the remainder of the products.

6. The process of manufacturing ethyl chloride comprising allowing hydrochloric acid gas and the vapors of ethyl alcohol to interact in the presence of fused zinc chloride.

7. The process of manufacturing ethyl chloride comprising allowing hydrochloric acid gas and ethyl alcohol vapors to interact in the presence of fused zinc chloride, conducting the products formed into a condenser wherein the water is condensed, and then separating the ethyl chloride from the residual vapors.

8. The process of manufacturing ethyl chloride comprising allowing hydrochloric acid and ethyl alcohol to interact in the presence of a catalyst maintained at a temperature sufficient to drive off the water formed during the interaction.

9. The process of manufacturing ethyl chloride comprising allowing hydrochloric acid gas and gaseous ethyl alcohol to interact in the presence of a fused catalyst maintained at a temperature sufficient to drive off the water formed during the interaction.

In testimony that I claim the foregoing, I have hereunto set my hand this 28 day of October, 1921.

ARTHUR A. BACKHAUS.